MAGNETIC CORE ASSEMBLY METHOD

Original Filed Nov. 21, 1961 2 Sheets-Sheet 1

INVENTOR.
EDWARD C. DOWLING
BY

MAGNETIC CORE ASSEMBLY METHOD

Original Filed Nov. 21, 1961 2 Sheets-Sheet 2

INVENTOR.
EDWARD C. DOWLING
BY 3,266,126
MAGNETIC CORE ASSEMBLY METHOD

Edward C. Dowling, Harrisburg, Pa., assignor to AMP Incorporated, Harrisburg, Pa.

Original application Nov. 21, 1961, Ser. No. 153,988, now Patent No. 3,150,355, dated Sept. 22, 1964. Divided and this application Dec. 27, 1963, Ser. No. 342,322
2 Claims. (Cl. 29—155.5)

This invention relates to a magnetic core assembly and method, and is a division of application Serial No. 153,988, filed November 21, 1961, and now U.S. Patent No. 3,150,355.

It is one object of the present invention to provide a magnetic core assembly of maximum component density and minimum production cost.

It is a further object of the invention to provide a magnetic core assembly having a high ratio of active components to inactive components.

It is another object of the invention to provide a method of assembling magnetic core devices reducing the difficulty of core wiring.

It is still another object of the invention to provide a magnetic core assembly having a high bit per volume capacity.

One of the principal problems of manufacturing magnetic core devices is that numerous relatively small cores, having even smaller major and/or minor apertures, must be wired with numbers of fine copper conductors. In addition to the problems of insulation generally present in component miniaturization, magnetic core assemblies must also eliminate the effects of stray field flux between cores and windings for proper circuit operation. Because of this, and because of wiring problems, prior art magnetic assemblies have generally tended toward arrangements with wide core and winding spacing utilizing a fixed insulating non-magnetizable board member. While devices of this sort undoubtedly serve to reduce production cost by avoiding tedious core wiring, the size, weight and volume required by such units limits their use generally, and reduces their utility in missile, satellite or other airborne equipment applications. Since the active components of magnetic core devices have a recognized advantage over other solid state components from considerations of weight, reliability and stability of operation in diverse environments including gamma radiation fields, the foregoing shortcomings of known assemblies are indeed unfortunate.

The present invention utilizes a novel, flexible folded tape assembly in conjunction with a unique core mounting frame incorporating core conductors to provide a high density package of low volume having few nonactive components. From the standpoint of bits of information per volume of package, the assembly of the present invention is far superior to known magnetic core assemblies and is competitive with even the simplest of other solid state devices of similar function.

As is described in U.S. application Serial No. 832,413, now Patent No. 3,046,549 particularly with reference to FIGURES 5A and 5B thereof, the wiring of magnetic core devices, such as shift registers, is greatly facilitated by arranging the cores assigned an "odd" core function and the cores assigned an "even" core function in two separate rows with the apertures thereof aligned to receive the advance windings. The present invention contemplates a core tape arrangement folded in a manner to provide alignment of the apertures of the "odd" and "even" cores of the shift register in two separate rows. The assembly of the present invention provides a mounting frame wherein the various drive windings are part of the core support and serve to implement core assembly. Additionally, prior to core-tape folding, core coupling and input windings may be inserted in the cores of the assembly of the invention with a minimum of effort and in a manner eliminating the need for skilled labor without increasing the opportunity for production error. The patent application heretofore mentioned and U.S. Patent No. 2,995,731 may be generally referred to for details of operation of magnetic core devices of the type particularly benefited by the advantages of the assembly and method of this invention.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figures 1, 1A:
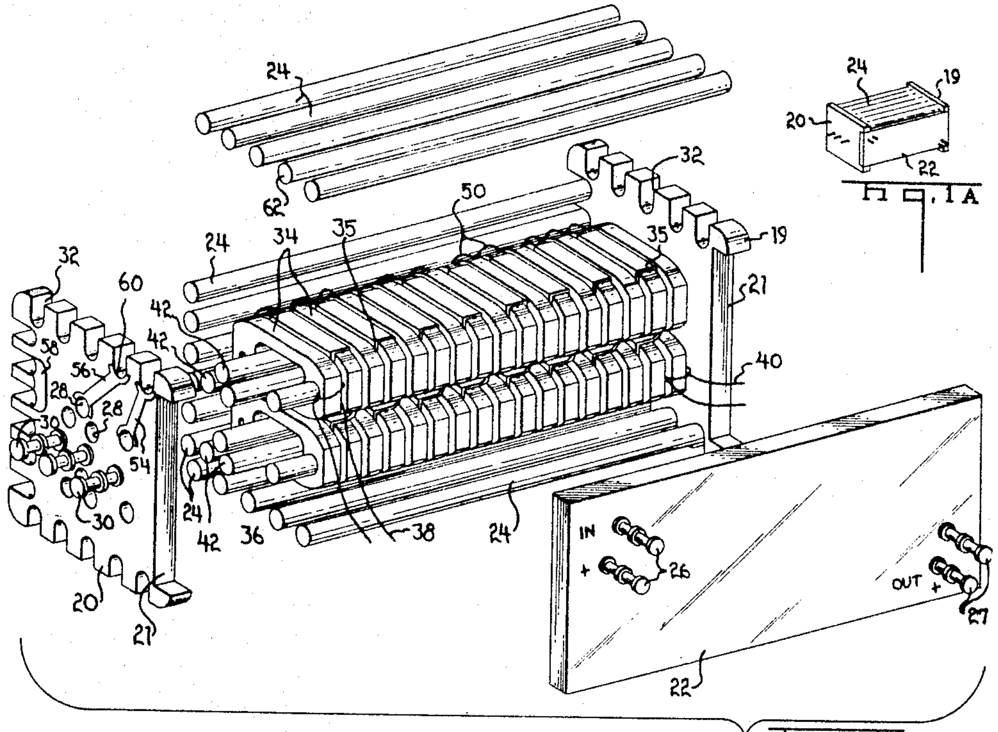
FIGURE 1 is an exploded view of the assembly of the present invention enlarged approximately five times actual size.
FIGURE 1A shows the approximate actual size of a 24 bit shift register similar to the embodiment of FIGURE 1.

A general description of the nature of the assembly of the invention will be given followed by a more detailed description of the method of the invention and the components employed. The assembly shown in FIGURE 1 includes two end plates 19 and 20, a series of relatively stiff copper conductors 24 and 42, a stacked array of multi-aperture magnetic cores and a terminal panel 22. When assembled the components shown in FIGURE 1 form a unitary core package of substantial mechanical strength. The stiff copper conductors 24 are secured in the notches 32 of the end plates 19 and 20, and the conductors 42 are secured in holes 28 of end plates 19 and 20 by means of epoxy or phenolic cement placed in notches 32 and holes 28 during assembly. The terminal board 22 is similarly secured to the end plates in notches 21. It will thus be apparent that the basic structure of the assembly of the invention is comprised of components which serve to perform an active function in addition to that of mechanically supporting the cores.

Referring further to the core assembly in FIGURE 1, it will be noted that the cores 34 are symmetrically disposed in two rows, with each row of cores having the major and minor apertures thereof in alignment and with each core spaced from any other core by at least one thickness of tape 35. Disposed on the end plate 20 are three terminals 30 which represent the "ADVANCE O to E," "COMMON and/or PRIME" and "ADVANCE E to O" input terminals for the application of drive and prime currents to the core assembly. Disposed on the end plate 19 is a fourth terminal 30 (not shown) which serves as a positive prime terminal for prime current input. The assembly of the device of FIGURE 1 thus would have three terminals on one end and one terminal on the other end for application of advance and prime inputs. Reference to the aforementioned application, Serial No. 832,413 may be had for a detailed description of the function of such input terminals.

In FIGURE 1 the terminals 30 are shown as separate terminals inserted in the end plates 19 and 20. In a preferred embodiment, the advance and prime terminals may be comprised of extensions of the conductors 42, which extend through the apertures of the cores 34 thereby eliminating the need for additional terminals. This would be accomplished by having three of the conductors 42 of greater length so as to extend through holes 28 for a distance sufficient to enable adequate termination and a further conductor 42, similarly extending through the opposite end plate for a distance sufficient to form a terminal at that end.

The terminals 26, mounted on panel 22, represent the core intelligence input and output terminals. During the assembly of the device the winding 38, linking the input or receiving aperture of the first core, is connected to the terminals 26, which extend through the panel 22. An output winding 40 is, in like fashion, wound through the last core output or transmit aperture and is connected to the output terminals 27 at the opposite end of the panel 22. It is to be understood that for parallel input or output, terminals similar to the terminals 26 shown may be disposed in rows across the panel 22 and connected by windings similar to 38 and 40 to all of the cores 34 individually with a connection to each set of terminal posts.

Referring now to the U.S. application and patent heretofore mentioned, it will be noted that advance and prime wiring may be accomplished with linear wiring i.e., the wiring is not individually turned or lumped on each core but passes through at least one row of cores. In the assembly of the invention, the conductive rods 24 and 42 form, respectively, the portions of advance and prime windings parallel to the core row longitudinal axis. The end plates 20 form the portions of the advance and prime windings perpendicular to the core longitudinal axis. The end plates 20 include conductive paths, such as 54, 56 and 58, linking the rods 24 and 42 to complete the drive and prime circuits. The end plates 20 may be formed from copper jacketed epoxy sheet material with desired paths such as 54, 56 and 58 rendered by etching away the copper jacket. Alternatively, the paths may be formed by stamped laminations secured to plates 20 in the manner of standard printed circuit technique. Connection between the end plate paths and the rod members can be by soldering. Referring to FIGURE 1, it will be apparent that rod 62, after insertion in the appropriate notch 32, will contact the portion 60 of path 56. The application of solder at the juncture of rod 62 and portion 60 will assure connection between these points. In similar manner, any of the rods 24 can be connected to any of the rods 42 and to the terminals 30 to form advance and prime windings of one or several turns.

The shift register shown in FIGURE 1 has a capability of seventeen bits, it being understood that the assembly of the invention would have the utility with applications requiring a greater or less bit capability than that shown.

FIGURE 1A is included to show the approximate actual size of a unit having a 24 bit capability. It is contemplated that the assembly and method of the invention would have utility in applications employing different core sizes and configurations from those shown.

Referring now to the tape member 35, as shown in FIGURE 1, it is contemplated that any thin, flexible, insulating non-magnetizable tape, such as acetate, paper or Mylar may be employed. As more clearly shown in FIGURES 2 and 3, the tape member 35 should be of a width slightly less than the distance between core minor apertures to facilitate core input and coupling wiring. Additionally, the tape member 35 should include a series of slots of a dimension defined by the major aperture of the core. The center to center distance between the slots 120 will vary depending upon the particular cores used. This center to center spacing should be sufficient to permit folding of the cores in the manner shown in FIGURES 3–6A.

Figure 2:
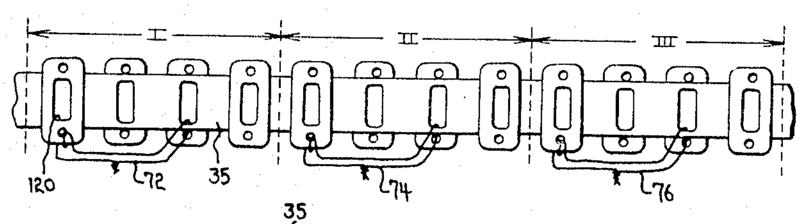
FIGURES 2, 2A and 2B show schematically a portion of the method of the invention wherein coupling windings are added in a series of steps to the core tape assembly.
Figure 2A:
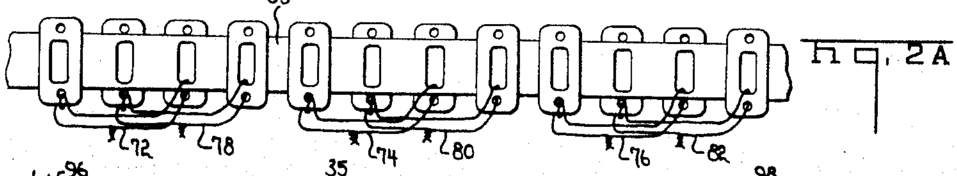

The first step of the method of the invention is shown in FIGURE 2, wherein the magnetic cores are placed in a defined sequence on the tape member 35. It will be noted that the twelve cores of FIGURE 2 are divided into sets of four cores or quads. The core placement for each quad is identical to the core placement of any other quad in the series of quads. This core placement calls for the end cores or first and fourth cores of any quad to be disposed on one side of the tape member 35 with the center cores or second and third cores to be disposed on the opposite side of the tape member 35. In actual production, it is contemplated that the tape member 35 will be pre-punched with the spacing of slots 120 spaced being used as indicia for core placement. The disposition of cores within a quad permits the novel stacking of cores shown in FIGURE 1, wherein there is one row of "odd" cores adjacent to one row of "even" cores. The cores may be secured to the tape member by a very light coating of contact cement or other binding material. As is apparent in the drawing of FIGURE 1, the core tape assembly does not require that the cores remain secured to the tape once the end plates 20 and conductors 24 and 42 have been set in place.

Figures 3, 3A, 4, 4A, 5, 5A, 6, 6A:
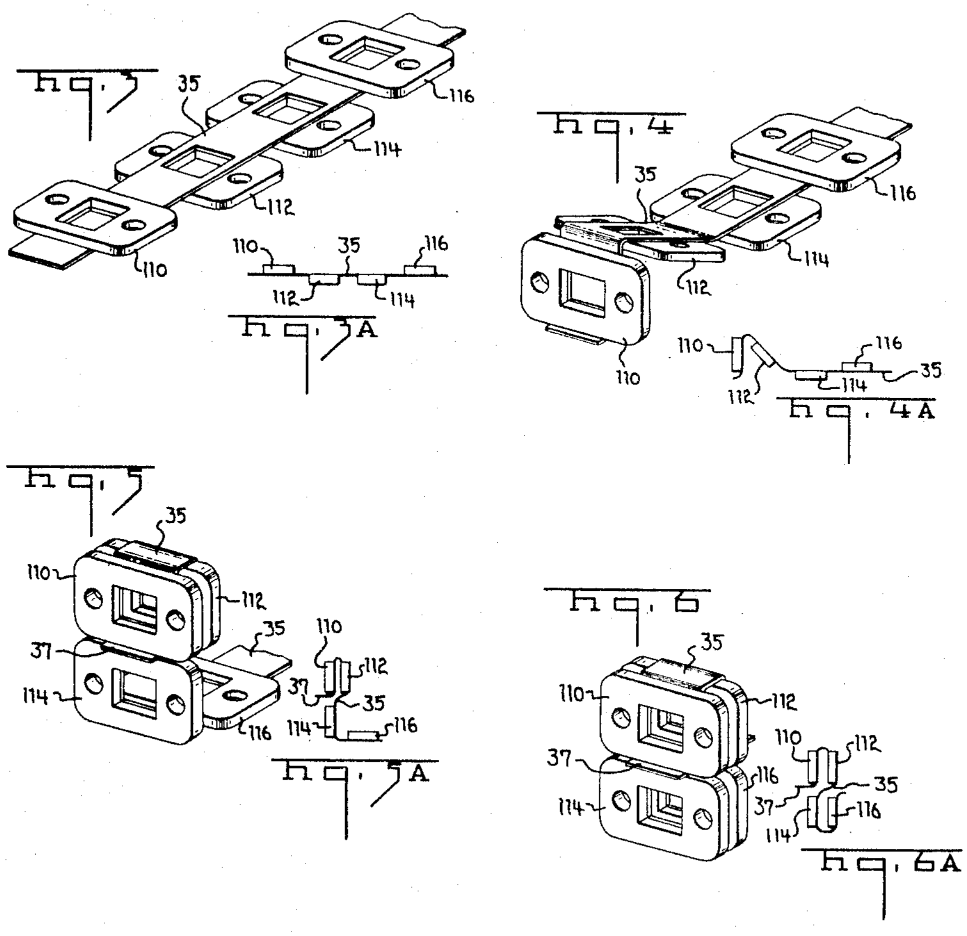
FIGURES 3–6A show the method steps contemplated by the invention involving the core tape fold.

The next step of the method of the invention is shown in FIGURES 3–6, wherein the four cores 110–116 represent the cores of any given quad. Beginning with the cores disposed, as shown in FIGURES 3 and 3A wherein the core tape assembly is generally disposed in a common plane, the core 110 is drawn into a vertical position as shown in FIGURES 4 and 4A and the adjacent core 112 disposed on the opposite side of the tape member 35 is drawn into an inclined position to rest adjacent core 110, as indicated in FIGURES 5 and 5A. The core adjacent core 112, disposed on the same side of tape 35, is tucked beneath the core 110 with the end portion of the tape member 35 shown as element 37 in FIGURE 5, disposed between core 110 and core 114. Core 116, which is disposed on the same side of tape 35 as core 110, is then folded flush against the tape adjacent core 114 and beneath the core 112, as shown in FIGURES 6 and 6A. It will be noted that the tape member 35 is maintained in at least one thickness between any core and an adjacent core. In a continuous core tape assembly, the second quad would be folded identical to that of the first quad so that for a given length of cores the method of folding will result in two rows of cores having at least one thickness of tape member therebetween.

Following the folding procedure, the cores will be loosely formed into two rows with each core of a given row having its apertures approximately aligned with the apertures of each other core of a given row. The stack of cores may then be compressed by insertion over the center conductors 42 as shown in FIGURE 1. In large scale production, long rows of folded core tape assemblies may be fabricated and stored for use with magnetic devices of different bit lengths, it being only necessary to cut the core tape assembly of the desired bit length.

Figure 2B:
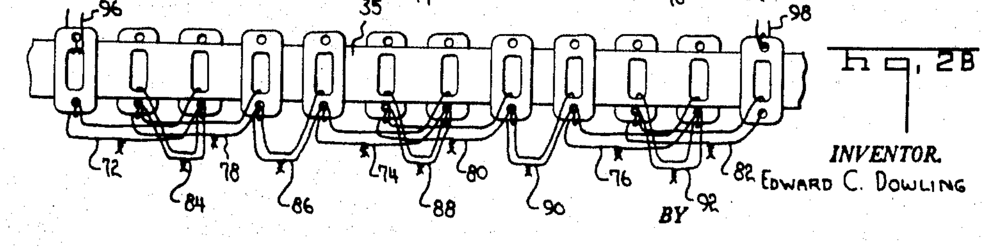

Referring now to FIGURE 2, a further aspect of the invention will be described with reference to the addition of coupling and core input windings. The initial arrangement of cores on the tape member 35 permits an alternative step wherein the coupling windings may be added to the cores in a series of steps prior to tape folding. The coupling windings 72, 74 and 76 coupling the first and third core of each quad are wound so that the output of the first core is connected to the input of the third core of each quad. FIGURE 2B shows the same series of 12 cores, wherein the second step of core winding includes the addition of coupling windings between the second core of each quad and the fourth core of the same quad. The couplings 78, 80 and 82 are similarly disposed to transfer a flux condition from the second core to the fourth core of a given quad. In FIGURE 2B the last step of core winding is shown with the addition of coupling loops 84, 86, 88, 90 and 92 between the second and third cores of each quad and coupling loops between the fourth or last core of a quad to the first core of the adjacent quad. Additionally, core input winding 96 is inserted in the inner leg of the first "odd" core of the core array and core output winding 98 is inserted through the outer aperture of the last "even" core of the core array. The coupling loops as shown here provide a path whereby flux remanence representative of intelligence may be shifted between "odd" and "even" cores and "even" and "odd" cores as in the manner described more completely in Patent No. 2,995,731.

The particular disposition of coupling loops is made on one side of the core tape assembly so that the other side is available for core input and output windings. Viewing FIGURE 1, the coupling loops are partially shown by numeral 50 folded against the core array, beneath the conductors 24.

The magnetic assembly formed by the method of the present invention may be used without additional treatment in many applications or alternatively, may be potted with plastic material such as silastic or soft-setting epoxy compounds flowed into the assembly between the conductors 24. Numbers of standard size bit length assemblies may be connected together to form a variety of bit lengths by suitable connections between terminals 30.

An actual 24 bit shift register constructed in accordance with the foregoing description was approximately 1 and ¾ inch in length by ⅜ inch in width and height. This represents a space saving over prior known register constructions of the same capability by a factor of about 25. The actual unit constructed employed General Ceramics No. F1243–5209 ferrite cores approximately 196 mils wide and of a configuration similar to those shown in FIGURE 2 secured to 2.5 mil Mylar tape. The end plates and the terminal panel were formed of 2 ounce epoxy fiber glass sheet, the end plates being copper jacketed as heretofore described. The external advance and prime wiring, heretofore referred to as rods 42 were AWG No. 26 rigid Formvar coated copper wires. The external wiring 24 was also AWG No. 26, but uncoated. The coupling loops and input windings were AWG No. 38 copper conductors.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. In a method of assembling magnetic core devices the steps comprising securing a plurality of magnetic cores each of which has at least one aperture to a flexible tape member having spaced slots therein with each core aperture aligned with a tape slot, the said cores being positioned on said tape in sets of four cores with the first and last core of a set on one side of the tape and the second and third core of a set on the opposite side of the tape, folding said tape to position the first and second cores of a set adjacent to each other with first and second core apertures in alignment, folding said tape to position the third and fourth cores of the same set adjacent to each other with the third and fourth core apertures in alignment with the first and second cores being adjacent to the third and fourth cores and with the tape between any two adjacent cores, and inserting conductive rods through the core apertures and tape slots.

2. The method of claim 1 wherein conductive windings are inserted through certain of said cores to link said cores in a pattern for intelligence transfer from core to core prior to the first folding step.

References Cited by the Examiner

UNITED STATES PATENTS

| | | | |
|---|---|---|---|
| 2,864,064 | 12/1958 | Heaton | 336—200 X |
| 2,911,605 | 11/1959 | Wales | 336—208 X |
| 2,937,351 | 5/1960 | Craig | 336—200 |
| 3,139,610 | 6/1964 | Crown | 340—174 |
| 3,188,721 | 6/1965 | Ringler | 29—155.5 |

FOREIGN PATENTS

| | | |
|---|---|---|
| 216,391 | 11/1957 | Australia. |

JOHN F. CAMPBELL, *Primary Examiner.*

WHITMORE A. WILTZ, *Examiner.*

R. W. CHURCH, *Assistant Examiner.*